(12) United States Patent
Lee

(10) Patent No.: US 11,847,269 B2
(45) Date of Patent: Dec. 19, 2023

(54) STYLUS AND TOUCH INTERACTIVE DEVICE

(71) Applicant: Silicon Integrated Systems Corp., Hsinchu (TW)

(72) Inventor: Min-han Lee, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 18/075,137

(22) Filed: Dec. 5, 2022

(65) Prior Publication Data

US 2023/0176664 A1    Jun. 8, 2023

(30) Foreign Application Priority Data

Dec. 8, 2021 (TW) .................................. 110214649

(51) Int. Cl.
*G06F 3/0354* (2013.01)
(52) U.S. Cl.
CPC ...... *G06F 3/03545* (2013.01); *G06F 3/03547* (2013.01)
(58) Field of Classification Search
CPC .................. G06F 3/03545; G06F 3/03547
See application file for complete search history.

(56) References Cited

U.S. PATENT DOCUMENTS

| | | | | |
|---|---|---|---|---|
| 2001/0014010 A1* | 8/2001 | Jenks | ..................... | G06F 1/1626 |
| | | | | 343/700 R |
| 2014/0043300 A1* | 2/2014 | Lien | ..................... | G06F 3/03545 |
| | | | | 345/179 |
| 2019/0129522 A1* | 5/2019 | Schwitzer | .............. | H01R 4/023 |
| 2021/0365168 A1* | 11/2021 | Jeon | ..................... | G06F 3/04166 |

FOREIGN PATENT DOCUMENTS

CN            113190130 A  *  7/2021   ........... G05D 1/0221

OTHER PUBLICATIONS

Machine translation of CN113190130A (Year: 2021).*

* cited by examiner

*Primary Examiner* — Patrick N Edouard
*Assistant Examiner* — Joseph P Fox
(74) *Attorney, Agent, or Firm* — Jacob M. Ward; Ward Law Office LLC

(57) ABSTRACT

A stylus and a touch interactive device is provided. The stylus includes a pen holder, a cover plate, and a circuit control assembly. The pen holder includes a pen head, a pen wall, and an accommodating space. A groove is defined in the pen wall and communicates with the accommodating space. The pen head is arranged at one end of the pen holder. The cover plate is arranged corresponding to the groove and covers the groove. The circuit control assembly is received in the accommodating space. The circuit control assembly includes a mainboard and a touch sensing module connected to the mainboard. The touch sensing module is attached to the pen wall or a first inner wall of the cover plate to form a touch sensing area. The touch sensing module is used to receive and sense at least one touch command of fingers in the touch sensing area.

8 Claims, 3 Drawing Sheets

STYLUS AND TOUCH INTERACTIVE DEVICE

CROSS-REFERENCE TO RELATED APPLICATIONS

This application claims priority to Taiwanese Patent Application No. 110214649, filed on Dec. 8, 2021, the entire disclosure of which is incorporated herein by reference.

FIELD

The present application relates to the field of electronic equipment and in particular, to a stylus and a touch interactive device.

INTRODUCTION

With the popularization of touch electronic devices, touch technology gradually becomes a part of everyday life. Styluses are used to connect users with touch devices. In conventional techniques, touch functions of the styluses are still too monotonous and can only satisfy users' simple touch operations on the touch devices. However, being portable electronic devices for enabling communication or operation functions between the users and the electronic devices, the styluses are still too monotonous if only used for touch functions, and the interactions between the touch electronic devices and the users are relatively simple. Therefore, designers and manufacturers aim to add more functions to the styluses, so as to enable a variety of interactions between the users and the electronic devices.

There are conventional styluses developed to meet the above-mentioned needs in the market. Specifically, in order to generate more interactive functions between the stylus and the touch device, multiple physical buttons are provided on a stylus body. However, the physical buttons can only provide limited functions due to a limited space of the stylus body and a limited number of buttons. Therefore, the touch functions and control methods of the conventional styluses certainly cannot meet the needs of the market and consumers.

SUMMARY

It is an objective of the present invention to provide a stylus and a touch interactive device, which enable more touch functions through a pen holder, thereby increasing interactivity and functionality of electronic devices.

Accordingly, the present invention provides a stylus, manipulated by fingers of one hand, wherein the stylus includes a pen holder, a cover plate, and a circuit control assembly. The pen holder includes a pen head, a pen wall, and an accommodating space. A groove is defined in the pen wall and communicates with the accommodating space, and the pen head is arranged at one end of the pen holder. The cover plate is disposed corresponding to the groove and covers the groove. The circuit control assembly is accommodated in the accommodating space. The circuit control assembly includes a mainboard and a touch sensing module connected to the mainboard. The touch sensing module is attached to the pen wall or a first inner wall of the cover plate to form a touch sensing area, and the touch sensing module is configured to receive and sense at least one touch command of one or more of the fingers in the touch sensing area.

According to one embodiment, the touch sensing module includes a touch chip, a touch conductive film, and a flexible circuit board, and the touch chip is electrically connected to the touch conductive film and is further connected to the mainboard through the flexible circuit board.

According to one embodiment, the stylus further comprises an adhesive layer, wherein the adhesive layer is disposed between the touch conductive film and the pen wall or the first inner wall to closely attach the touch sensing module to the pen wall or the first inner wall.

According to one embodiment, one end of the flexible circuit board of the touch sensing module further includes a connector, the mainboard comprises a socket, and the connector is electrically connected to the socket.

According to one embodiment, the pen holder further comprises a trench, the touch sensing module is correspondingly disposed in the trench and attached to a second inner wall of the trench, and the pen head comprises a pen core and a positioning block for fixing the pen core.

According to one embodiment, a thickness of the second inner wall is less than a thickness of the first inner wall.

The present invention provides a touch interactive device, including a stylus and an electronic device. The stylus is manipulated by fingers of one hand. The stylus includes a pen holder, a cover plate, and a circuit control assembly. The pen holder includes a pen head, a pen wall, and an accommodating space. A groove is defined in the pen wall and communicates with the accommodating space, and the pen head is arranged at one end of the pen holder. The cover plate is disposed corresponding to the groove and covers the groove. The circuit control assembly is accommodated in the accommodating space. The circuit control assembly includes a mainboard and a touch sensing module connected to the mainboard. The touch sensing module is attached to the pen wall or a first inner wall of the cover plate to form a touch sensing area. The touch sensing module is configured to receive and sense at least one touch command of one or more of the fingers in the touch sensing area. The electronic device receives the at least one touch command and executes at least one interactive operation corresponding to the at least one touch command.

According to one embodiment, the at least one touch command comprises one or a combination of finger sliding, finger rotating, or finger tapping once or more times in the touch sensing area, and the at least one interactive operation comprises one or a combination of moving a cursor, selecting an object, moving an object, or positioning an object.

According to one embodiment, a size of the touch sensing area is same as an area of the touch sensing module.

According to one embodiment, the electronic device further comprises a pen slot for receiving the stylus.

The present invention adopts a touch chip (IC) and a touch conductive film (sensor) with touch functions. The touch conductive film is combined with the trench of the pen holder or the cover plate. Therefore, the present invention enhances competitiveness and adding values of the stylus, achieves simple and easy operations to meet the needs of users and the market, and realizes diversified control demands of the users.

DRAWINGS

In order to ease understanding of the above descriptions of the present invention, preferable embodiments are provided below in conjunction with the accompanying drawings, which are described in detail as follows.

DETAILED DESCRIPTION

Figure 1:
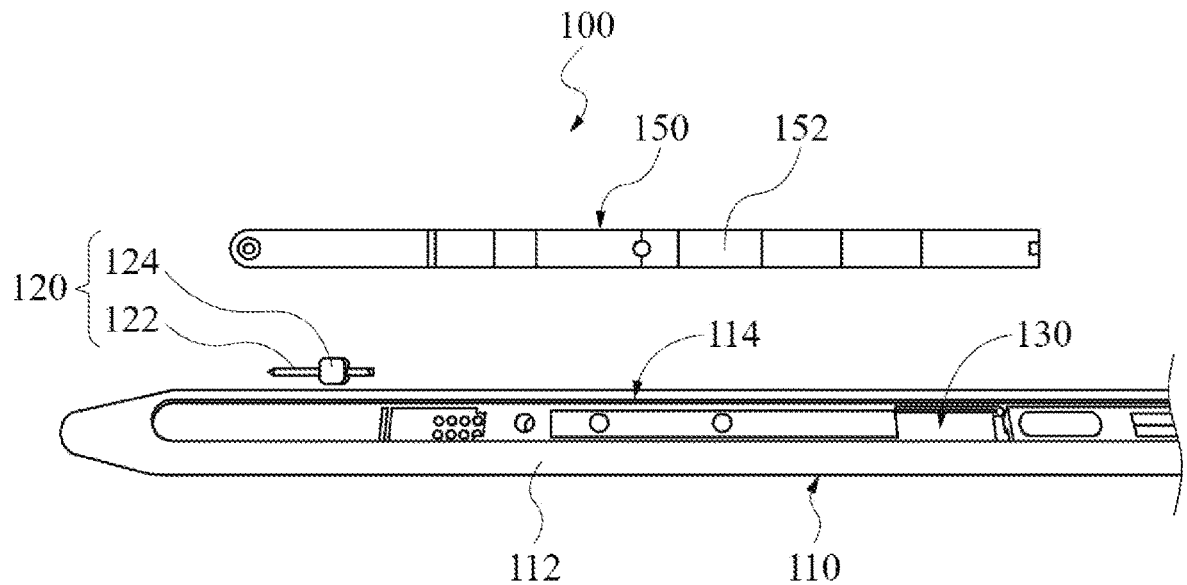
FIG. 1 is a schematic partial three-dimensional view (a first embodiment view) of a stylus of the present invention.

Please refer to the accompanying drawings. The same reference numerals denote the same or similar elements. Working principles of the present invention are described using examples implemented in a suitable environment. The following description is based on specific embodiments of the present invention and should not be construed as a limitation to other embodiments of the present invention which are not detailed herein.

Figure 2:
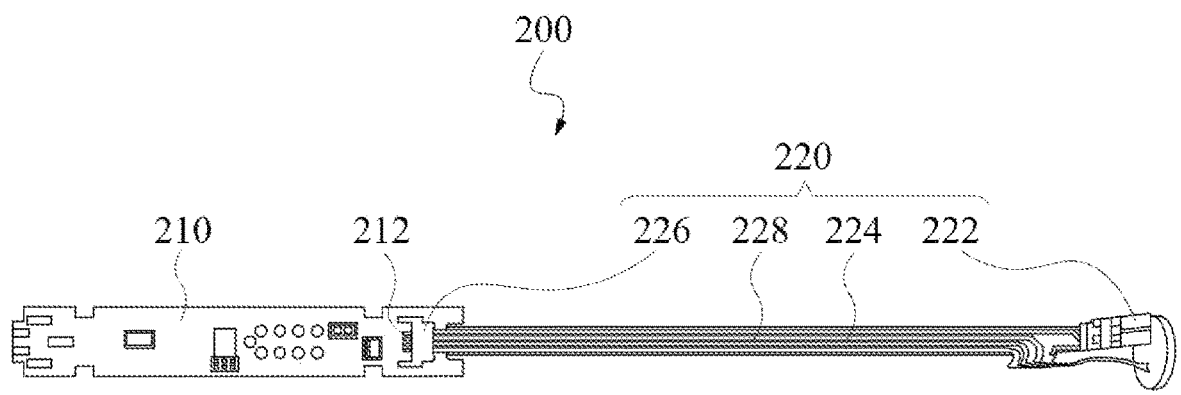
FIG. 2 is a schematic three-dimensional view of a circuit control assembly of the present invention.

As shown in FIG. 1 and FIG. 2, the present invention provides a stylus 100 manipulated by fingers of one hand, so as to perform writing, drawing, or other operations on touch devices such as smart phones, tablets, touch screens, and other electronic devices. Specific touch operations are conventional techniques, and a detailed description is omitted for brevity.

In a first embodiment shown in FIGS. 1 and 2, the stylus 100 comprises a pen holder 110, a cover plate 150, and a circuit control assembly 200. The pen holder 110 has a pen head 120, a pen wall 112, and an accommodating space 130. A groove 114 is defined in the pen wall 112 and communicates with the accommodating space 130. The pen head 120 is disposed at one end, such as a tip, of the pen holder 110. In the embodiment shown in FIG. 1, the pen head 120 preferably further includes a pen core 122 made of a conductive material and a positioning block 124 for fixing the pen core 122, wherein the positioning block 124 can fix the pen core 122 inside the pen holder 110.

It should be noted that the conductive material includes, for example, metals, conductive metal alloys, conductive plastic, and conductive rubber. The metals and metal alloys are, for example, silver, copper, gold, aluminum, or alloys thereof. The conductive plastic and conductive rubber are made by uniformly distributing conductive particles in plastic or silicone rubber. The conductive particles are made of, for example, silver-plated glass, silver-plated aluminum, or silver. The conductive particles contact under pressure to achieve good conductivity. The above-mentioned various conductive materials are not limited in the present embodiment.

Figure 3:
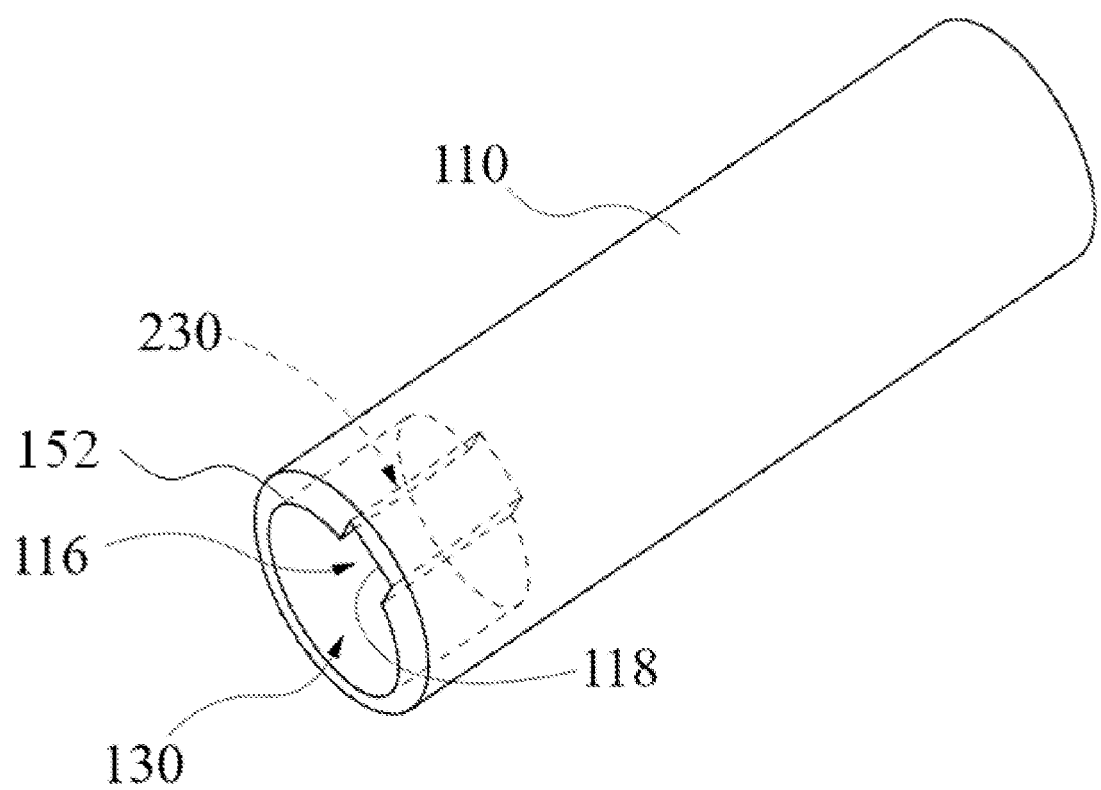
FIG. 3 is another schematic three-dimensional view (a second embodiment view) of the stylus.

Please also refer to FIG. 3. In a second embodiment, the cover plate 150 is disposed corresponding to the groove 114 and covers the groove 114 to cover the entire accommodating space 130. The circuit control assembly 200 can be accommodated in, for example, the accommodating space 130. The circuit control assembly 200 includes a mainboard 210 and a touch sensing module 220 connected to the mainboard 210. The touch sensing module 220 is attached to the pen wall 112 or a first inner wall 152 of the cover plate 150 to form a touch sensing area 230 (as shown in FIG. 3), or is attached to an entire length of the first inner wall 152 of the cover plate 150, which facilitates touch operations such as sliding and clicking (as shown in FIG. 1).

In the embodiment shown in FIG. 2, the touch sensing module 220 further includes a touch chip 222, a touch conductive film 224, and a flexible circuit board 228. The touch chip 222 is electrically connected to the touch conductive film 224 and is further connected to the mainboard 210 through the flexible circuit board 228. One end of the flexible circuit board 228 of the touch sensing module 220 further includes a connector 226. The mainboard 210 includes a socket 212, and the connector 226 is electrically connected to the socket 212, so that the touch command is transmitted to a control chip (not illustrated) of the mainboard 210 through the flexible circuit board 228. Specifically, when the circuit control assembly 200 is assembled in the pen holder 110, the touch conductive film 224 of the touch sensing module 220 preferably corresponds to a whole area of the cover plate 150, so that the touch sensing area 230 is used for receiving and sensing at least one touch command of one or more of the fingers (not illustrated) such as sliding and clicking.

In the embodiment shown in FIG. 3, the pen holder 110 further includes a trench 116. The touch sensing module 220 is correspondingly disposed in the trench 116 and attached to a second inner wall 118 of the trench 116. A thickness of the second inner wall 118 is less than a thickness of the first inner wall 152, thus increasing performance and sensitivity of finger touch operations.

It should be noted that the touch sensing module 220 activates switches by capacitive sensing. When in use, the touch sensing area 230 is lightly touched with the finger, and electric charges on a human body changes a capacitance value in the touch sensing area 230. Through circuit conversion, the switches or signals are activated to complete various touch commands. Specifically, the at least one touch command includes one or a combination of sliding, rotating, or tapping once or more times in the touch sensing area 230, wherein a size of the touch sensing area 230 is preferably the same as an area of the touch sensing module 220.

In addition, it should be noted that the mainboard 210 in the present embodiment also includes a control module (not illustrated) and a power module (not illustrated); however, the present invention is not limited in this regard. In other different embodiments, the mainboard 210 can also include a Bluetooth module, a local area wireless network module, or a microphone module, and designs can be added as needed; the present invention is not limited in this regard. A circuit module can be a charging module. When the charging module is taken as an example, the pen holder 110 can be equipped with a connector (not illustrated) that conforms to micro-USB, USB Type-C, or lightning interface specifications, the connector is connected to a charging socket (not illustrated) of a touch electronic device to perform wired charging, so that the power transmitted by the charging socket can be supplied to the power module through the above-mentioned interface by means of the charging module to thereby charge the stylus 100. Furthermore, the charging module can also have a built-in receiving coil and a rectifying circuit (not illustrated), and the receiving coil receives electromagnetic wave energy transmitted by external power supply equipment, and the rectifying circuit rectifies the received power, and then passes the power to the power module through the above-mentioned interface to charge the stylus 100 in a wireless charging manner.

Figure 4:
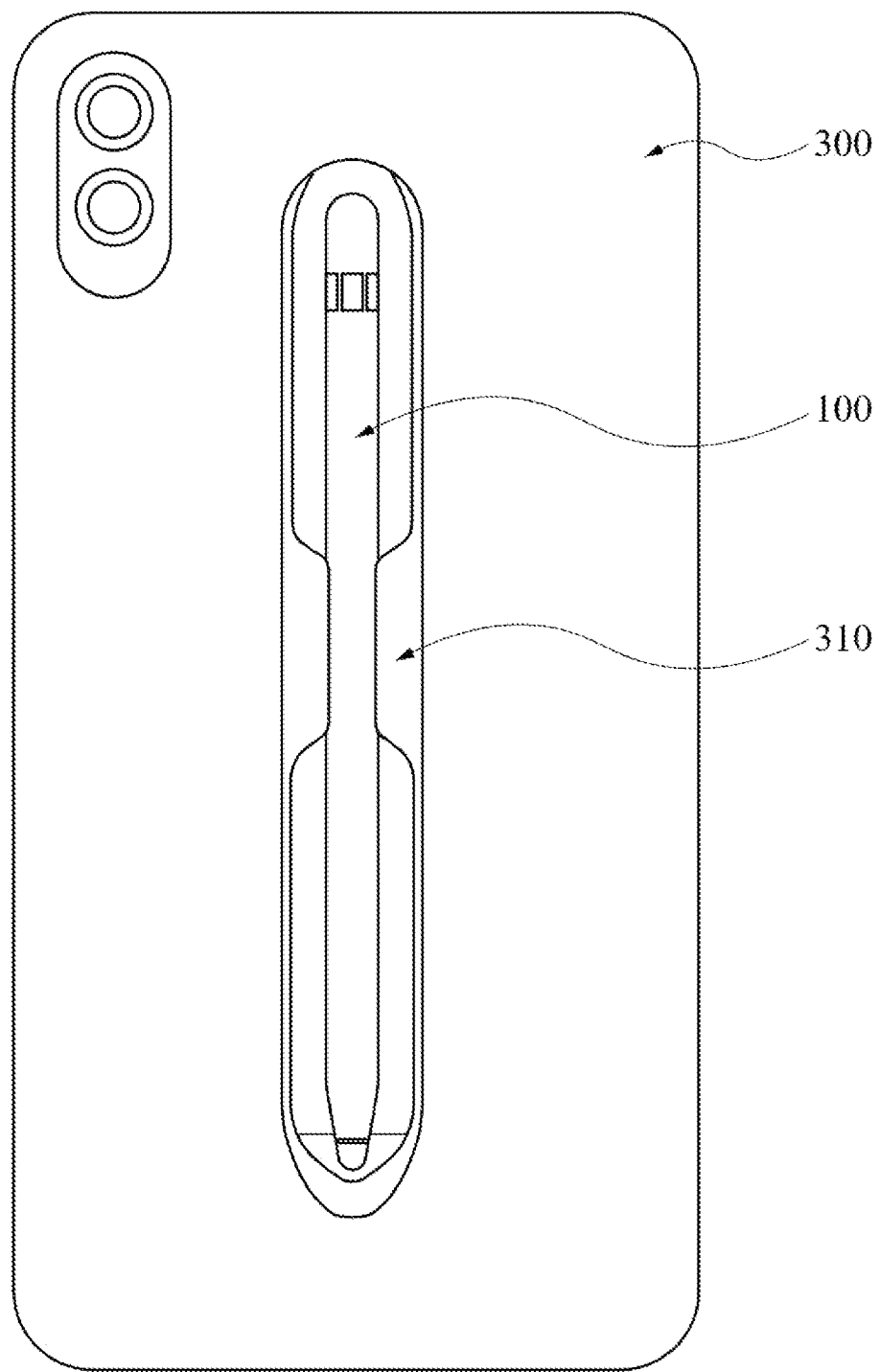
FIG. 4 is a schematic view of a touch interactive device according to one embodiment of the present invention.

Please also refer to FIG. 4. The present invention also provides a touch interactive device 300, including a stylus 100 and an electronic device 300. The stylus 100 is manipulated by fingers of one hand. The stylus 100 includes a pen holder 110, a cover plate 150, and a circuit control assembly 200. The pen holder 110 includes a pen head 120, a pen wall 112, and an accommodating space 130. A groove 114 is defined in the pen wall 112 and communicates with the accommodating space 130, and the pen head 120 is disposed at one end of the pen holder 110. The cover plate 150 is disposed corresponding to the groove 114 and covers the groove 114. The circuit control assembly 200 is accommodated in the accommodating space 130. The circuit control assembly 200 includes a mainboard 210 and a touch sensing module 220 connected to the mainboard 210. The touch sensing module 220 is attached to the pen wall 112 or a first inner wall 152 of the cover plate 150 to form a touch sensing area 230. The touch sensing module 220 is used for receiving and sensing at least one touch command of the fingers in the touch sensing area 230. A size of the touch sensing area 230 is the same as an area of the touch sensing module 220. The electronic device 300 receives the at least one touch command and executes at least one interactive operation corresponding to the at least one touch command.

In the present embodiment, the structure and operation of the stylus 100 are described in the above embodiments, and the description is not repeated here. The electronic device 300 includes a touch electronic device, such as a smart phone, a tablet, or a touch screen, and the present invention is not limited in this regard. The electronic device 300 further includes a pen slot 310 for receiving the stylus 100 therein. The pen slot 310 can be an engagement slot or an accommodating slot, and the present invention is not limited in this regard.

In the embodiment shown in FIG. 4, the at least one touch command includes one or a combination of sliding, rotating, or tapping once or more times in the touch sensing area 230, and at least one interactive operation includes one or a combination of moving a cursor, selecting an object, moving an object, or positioning an object. However, in other different embodiments, the touch command can also conveniently realize functions of general touch keys, such as zooming in and out, multi-finger touch, and other functions, so that the man-machine interface better satisfies people's needs.

Accordingly, the present invention adopts a touch chip 222 (IC) and a touch conductive film 224 (sensor) with touch functions. The touch conductive film 224 are combined to the trench 116 of the pen holder 110 or the cover plate 150. Therefore, the present invention enhances competitiveness and adding values of the stylus 100, achieves simple and easy operations to meet the needs of users and the market, and realizes diversified control demands of the users.

The above-mentioned embodiments are only examples of the present invention and used to explain the technical characteristics of the present invention, rather than limiting the protection scope of the present invention. Any changes or equivalent arrangements that can be easily accomplished by persons of skill in the art and should fall within the protection scope of the present invention. The protection scope of the present invention is defined by the appended claims.

What is claimed is:

1. A stylus, manipulated by fingers of one hand, wherein the stylus comprises:
   a pen holder comprising a pen head, a pen wall, a trench, and an accommodating space, wherein a groove is defined in the pen wall and communicates with the accommodating space, and the pen head is arranged at one end of the pen holder;
   a cover plate disposed corresponding to the groove and covering the groove; and
   a circuit control assembly accommodated in the accommodating space, wherein the circuit control assembly comprises a mainboard and a touch sensing module connected to the mainboard, the touch sensing module is attached to the pen wall or a first inner wall of the cover plate to form a touch sensing area, the touch sensing module is correspondingly disposed in the trench and is attached to a second inner wall of the trench, and a thickness of the second inner wall is less than a thickness of the first inner wall, and the touch sensing module is configured to receive and sense at least one touch command of one or more of the fingers in the touch sensing area.

2. The stylus according to claim 1, wherein the touch sensing module comprises a touch chip, a touch conductive film, and a flexible circuit board, and the touch chip is electrically connected to the touch conductive film and is further connected to the mainboard through the flexible circuit board.

3. The stylus according to claim 2, wherein one end of the flexible circuit board of the touch sensing module further comprises a connector, the mainboard comprises a socket, and the connector is electrically connected to the socket.

4. The stylus according to claim 1, wherein the pen head comprises a pen core and a positioning block for fixing the pen core.

5. A touch interactive device, comprising:
   a stylus, manipulated by fingers of one hand, wherein the stylus comprises:
      a pen holder comprising a pen head, a pen wall, a trench, and an accommodating space, wherein a groove is defined in the pen wall and communicates with the accommodating space, and the pen head is arranged at one end of the pen holder;
      a cover plate disposed corresponding to the groove and covering the groove;
      a circuit control assembly accommodated in the accommodating space, wherein the circuit control assembly comprises a mainboard and a touch sensing module connected to the mainboard, the touch sensing module is attached to the pen wall or a first inner wall of the cover plate to form a touch sensing area, the touch sensing module is correspondingly disposed in the trench and is attached to a second inner wall of the trench, and a thickness of the second inner wall is less than a thickness of the first inner wall, and the touch sensing module is configured to receive and sense at least one touch command of one or more of the fingers in the touch sensing area; and
   an electronic device receiving the at least one touch command and executes at least one interactive operation corresponding to the at least one touch command.

6. The touch interactive device according to claim 5, wherein the at least one touch command comprises one or a combination of finger sliding, finger rotating, or finger tapping once or more times in the touch sensing area, and the at least one interactive operation comprises one or a combination of moving a cursor, selecting an object, moving an object, or positioning an object.

7. The touch interactive device according to claim 5, wherein a size of the touch sensing area is same as an area of the touch sensing module.

8. The touch interactive device according to claim 5, wherein the electronic device further comprises a pen slot for receiving the stylus.

* * * * *